June 2, 1959  L. PON  2,888,803
INTERMITTENT COMBUSTION TURBINE ENGINE
Filed Aug. 30, 1954  2 Sheets-Sheet 1

INVENTOR
Lemuel PON
BY
ATTORNEYS

June 2, 1959 L. PON 2,888,803
INTERMITTENT COMBUSTION TURBINE ENGINE
Filed Aug. 30, 1954 2 Sheets-Sheet 2
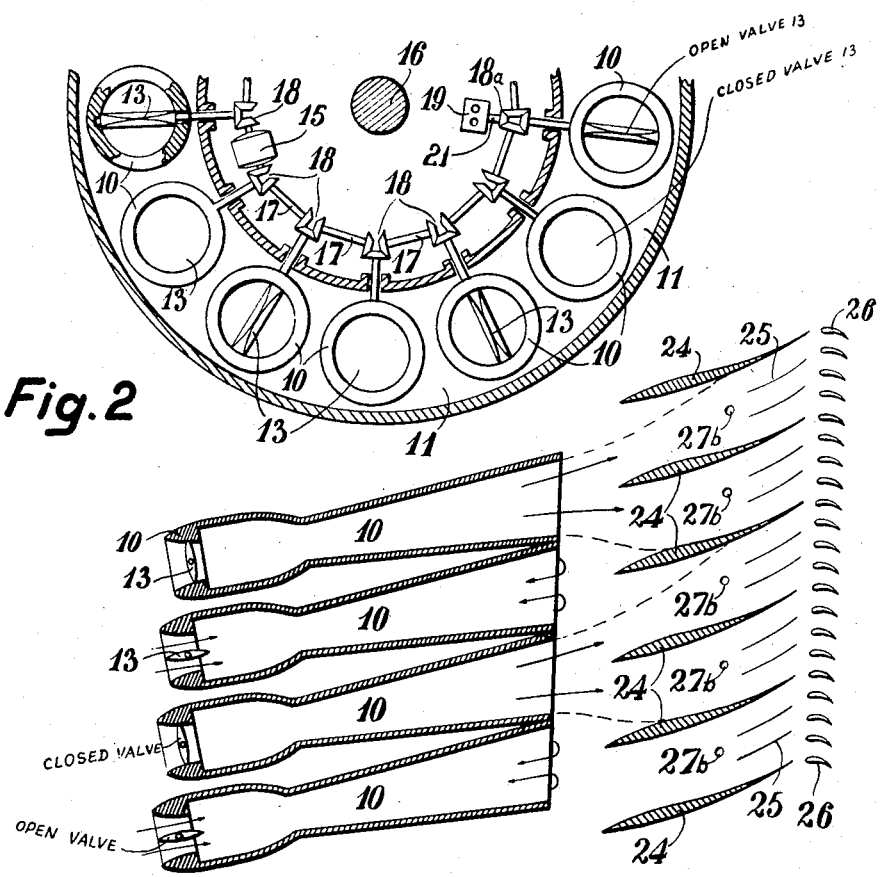
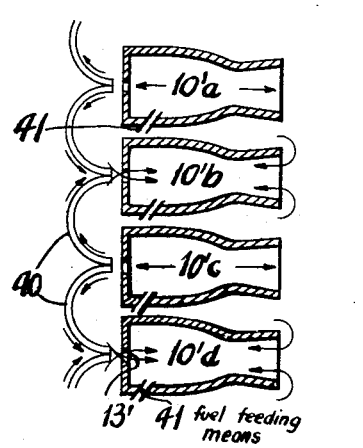
INVENTOR
Lemuel PON
BY
ATTORNEYS United States Patent Office 2,888,803
Patented June 2, 1959

2,888,803
INTERMITTENT COMBUSTION TURBINE ENGINE

Lemüel Pon, Montreal, Quebec, Canada

Application August 30, 1954, Serial No. 452,892

18 Claims. (Cl. 60—39.38)

The present invention relates to gas turbines and more specifically, an engine embodying an intermittent combustion gas turbine of improved character.

In the art of gas turbines it has long been recognized that the explosion (intermittent firing combustion at constant volume) turbine has a theoretical advantage over the continuous combustion (at constant pressure) turbine in that the addition of heat at constant volume is thermodynamically more efficient than the addition of heat at constant pressure. The addition of heat at constant volume in the explosion turbine causes both an increase in pressure and in temperature; consequently, for a given maximum turbine inlet gas temperature, the available expansion work of the working fluid through the turbine system is greater in the explosion turbine than in an equivalent continuous combustion turbine.

In the past art of the explosion turbine, the aforementioned theoretical advantage has been offset in practice by the mechanically complicated methods of accomplishing intermittent explosive combustion and the inefficient extraction of the expansion work available. Inefficiency of work extraction arises from the intermittent rise and fall of the combustion chamber pressure (inherent in an explosion process) causing fluctuation of the velocity of the gases flowing into the turbine. This results in a wide variation in the incidence angle of the gas stream on the turbine blades. Since the turbine blades operate efficiently only within a limited range of incidence angles, a wide incidence angle variation beyond the efficient operating range results in poor work extraction characteristics.

My invention relates to an intermittent firing combustion gas turbine engine able to accomplish explosive combustion by simple means and able to extract the maximum available energy from the working fluid.

Consequently, the main object of this invention is to provide a gas turbine power plant having an improved efficiency over gas turbines operating on the continuous combustion cycle, while retaining the relative mechanical simplicity of the continuous combustion turbine engine.

Further objects of this invention contemplate a turbine power plant characterized by the following:

(1) Combustion gases are generated at approximately constant volume by mechanically simple gas generators.

(2) Combustion at approximately constant volume at higher temperatures and pressures for a given turbine inlet temperature than existing turbine engines.

(3) Intermittent explosive combustion carried out at high frequencies such that a steady state is approached.

(4) Fluctuation of the combustion gas discharge velocity caused by the intermittent nature of explosive combustion reduced to a minimum before entry into the turbine system.

(5) A turbine system having high efficiency of operation over a wider range of gas stream to turbine blade incidence angles i.e. high turbine efficiency over large variations of gas stream velocity.

(6) Quick and easy starting of the engine without the use of a high powered auxiliary starting device.

These and other objects and advantages of this invention will become apparent as the discussion proceeds and is considered in connection with the accompanying drawings wherein like characters of reference designate like parts in the several figures.

Figure 2 is a transverse half section taken approximately along line 2—2 of Figure 1;

Figure 3 is a diagrammatic view of a developed section of that part of the engine comprising the circle of intermittent-firing combustion gas generators, the annular collector duct and turbine inlet nozzle, and the first row of turbine rotor blades;

Fig. 4 is a diagrammatic view of the acoustical coupling of the combustion generators.

Figure 1:
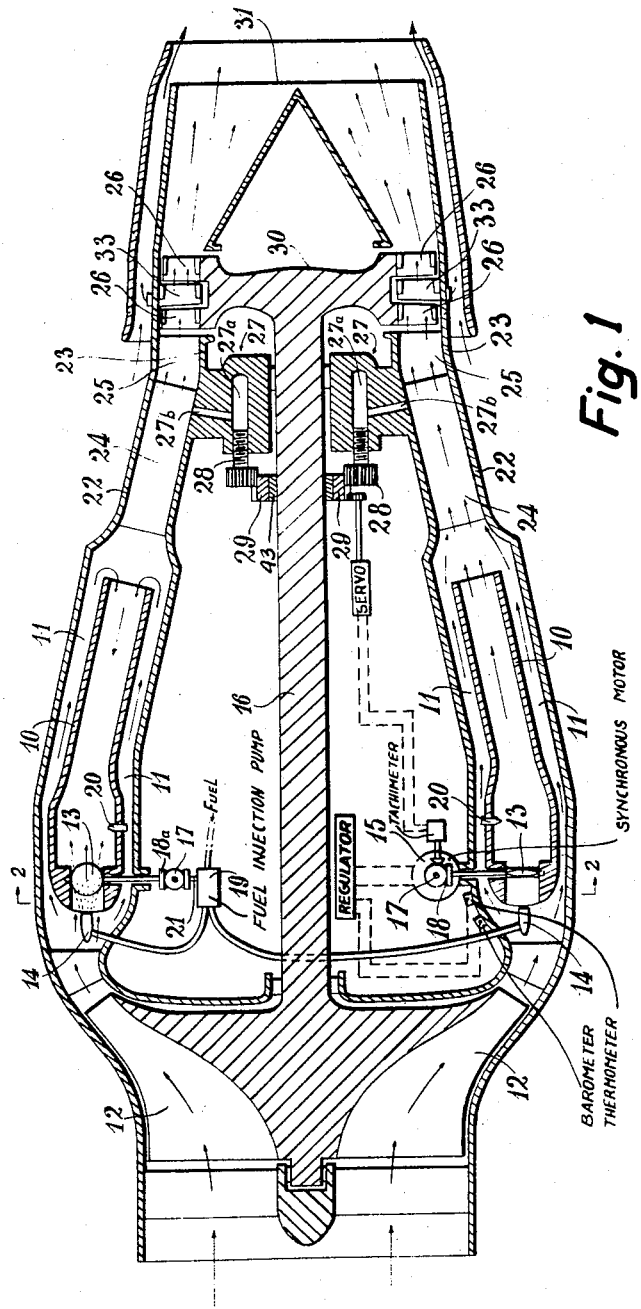
Figure 1 is a longitudinal section taken axially of an embodiment of the engine according to the invention.

Referring to the drawings, a plurality of intermittent-firing gas generators of the reso- or pulse-jet type hereinafter called resonant pulse tubes or simply pulse tubes are designated by the numeral 10. The pulse tubes 10 are fixed and enclosed within an annular chamber 11 into which air is compressed by the compressor system 12. Combustion air enters the pulse tubes 10 through the directional flow check valves 13 while fuel is introduced by suitable fuel injector nozzles 14. The valves 13 are of any suitable type for conventional pulse-jet motors provided they have an operating life consistent with the operating life of the other parts of the engine. In the form illustrated in Figs. 1 to 3, the valves 13 are conventional high speed rotating valves, while in Figure 4, valves 13' are acoustical check valves.

The resonant pulse tubes 10 are arranged in a circle, concentric about the turbine shaft 16, as shown in Figure 2. The operation of the pulse tubes 10 is synchronized so that if the pulse tubes 10 are numbered consecutively around the circular arrangement, explosions take place simultaneously in the odd numbered pulse tubes in alternation with the simultaneous explosions in the even numbered pulse tubes. Depending on the type of flow check valves used on the pulse tubes 10, the desired synchronization may be effected by acoustical coupling, synchronized fuel injection, or mechanically coupled flow check valves etc. In the form illustrated in Figures 1 to 3 both synchronized fuel injection and mechanically coupled valves are combined to achieve the desired synchronization. The synchronous motor 15 drives the rotating valves 13 through suitable mechanical linkages 17 and couplings 18. The rotating valves of the odd numbered pulse tubes are phased approximately 90 degrees from the rotating valves of the even numbered pulse tubes as illustrated in Figures 2 and 3. The phase angle is susceptible to being varied by relative adjustment of the couplings 18 to obtain the phasing giving optimum efficiency.

In the operation of the engine, the temperature and density of the air in the chamber 11 will vary with operating conditions. Since the optimum frequency of operation of the pulse tubes 10 is a function of the state of the surrounding air, the synchronous motor 15 driving the check valves 13 of the pulse tubes 10 is subject to governing by a barometer and thermometer (Fig. 1) defining the state of the air in chamber 11, and correspondingly controlling a regulator which determines the speed of motor 15.

The synchronous motor 15 also drives a fuel injection pump 19 by connecting the drive shaft 21 of the pump 19 to any convenient point in the mechanical system driven by the synchronous motor 15 such as one of the couplings 18a as illustrated. The fuel injection pump 19 is designed to alternately inject fuel into two fuel distributing systems, one distributing fuel to the odd numbered pulse tubes and the other distributing fuel to the even numbered pulse tubes. The fuel injecting frequency is synchronized with the valve rotation such that fuel is injected into the air entering pulse tubes 10 through inlet valves 13, the phasing between fuel injection and valve position being such as to give maximum operating efficiency. The fuel pump 19 is subject to governing by the factors defining the proportioning of the fuel such as mass air flow, temperature and pressure etc.

An acoustical system known per se may be used instead of the system shown in Fig. 1, and is illustrated in Fig. 4. This system comprises acoustical check valves 13' which are merely restricting holes in the tubes 10'a to 10'd, and coupling elements 40, which consist of curved pipes facing and distanced from the valves 13' of two tubes to be coupled. In the drawing, explosion is taking place in tube 10'a and 10'c. The cycle of operation of the pulse tubes is synchronized by a plug of high velocity combustion gas oscillating in the coupling pipes 40. Fuel is injected through 41, or it may be introduced through the valve hole 13'.

During engine starting, ignition is initiated with an electrical energy source (not shown) by either a synchronized distributor system and conventional spark plugs or simply by means of glow plugs 20 suitably disposed in the combustion chamber of each resonant pulse tube 10. Once all the pulse tubes 10 are firing, the electric energy may be turned off, ignition then proceeds from the hot residual gases of the preceding explosions.

During part of the operating cycle of the pulse tubes 10, air is ingested through the tail pipe orifices of the pulse tubes. For this reason the tail pipe orifices are disposed in the chamber 11 such as to promote easy entrance of the air from the chamber into the tail pipe orifices. The orifices are shaped such that when they are placed one against the other they form approximately an annular ring centrally disposed within the annular outlet of the chamber 11. The annular outlet of the chamber 11 is joined to and in communication with the inlet of the anular collector duct 22.

The discharge of gases from the pulse tubes 10 is directed into the annular collector duct 22 which converges to merge with the turbine entry nozzle annulus 23. Preferably, the radial distance of the tail pipe orifices of the pulse tubes from the axis of the engine should be greater than the radius of the turbine annulus 23, so as to facilitate the distribution of the gas flow evenly around the turbine nozzle.

Within the annular collector duct 22 are disposed the guide vanes 24; the design of the collector duct and guide vanes is such as to catch alternately the gaseous discharges from the odd and then the even numbered pulse tubes and distribute the gas flow evenly around the turbine nozzle annulus 23. This is diagrammatically shown in Figure 3, at least one guide vane along the projected longitudinal center line of the tail pipe of each pulse tube 10 being required. Additional nozzle guide vanes 25 are located in the turbine entry nozzle 23 to direct the gas flow in the required direction for entry into the first row of turbine rotor blades 26.

Tapped to each passage formed between two guide vanes 24 are one or more Helmholtz-type resonators 27, each comprising a cavity 27a and a bore 27b connecting the cavity 27a to the passage. The shape of the tap-off opening of the bore 27b and its location in the passage should be such as to cause the least disturbance to the gas flow. The natural frequency of the resonators 27 is subject to individual adjustment by the screw plugs 28 and collective adjustment by the ring gear 29 mounted on a bearing 43 on shaft 16, and mechanically coupled to all the screw plugs 28. The screw plugs 28 vary the natural frequency of the resonators 27 by varying the volume of the cavities 27a. The frequency of the resonators is tuned to approximately twice the frequency of operation of the pulse tubes 10 by a governing system in which the speed of rotation of the synchronous motor 15 supplies the command signal and the feed back signal is from the position of the screw plugs 28. As shown in Fig. 1 the governing system comprises a tachometer on the motor 15 controlling a servo which operates gear 29.

The gases issuing from the annulus 23 are passed through one or more turbine stages which extract power to turn the turbine rotor wheel 30 driving the compressor 12 through the connecting shaft 16. The gases may then be ejected through the nozzle 31 to derive jet propulsive reaction, or the gases may be passed through additional turbine stages to obtain mechanical power.

The turbine stages are composed of turbine rotor blades 26 attached to the turbine rotor wheel 30, and of turbine stator blades 33.

In the operation of the engine, high frequency explosive combustion at approximately constant volume is accomplished by the plural number of resonant pulse tubes of the pulse or reso-jet type. The conventional reso-jet consists simply of a shaped tube, the larger forward section being the combustion chamber narrowing down to a tail pipe length of smaller cross sectional area. At the forward end of the combustion chamber is fitted a directional flow check valve. The general sequence of operations of reso-jets is well known in the art.

In the present invention, efficient work extraction from the fluctuating velocity gas streams discharging from intermittent-firing combustion gas generators is accomplished by reducing the velocity fluctuation to less than one half before the gases flow into the turbine system.

The work extraction of an axial turbine rotor is a function of the ratio of the peripheral velocity of the moving blade row to the absolute gas velocity. For any work recovery at all, the gas velocity must be greater than the blade velocity. For a single pulse tube where the discharge velocity varies from zero to a maximum, no work would be extracted by the turbine from the gas stream for any gas velocity ranging from zero to a value equal to the peripheral velocity of the rotor blade row. Thus the major loss in work extraction from a gas stream of fluctuating velocity is in the low velocity range of the fluctuations. By reducing the velocity fluctuation one half so that the variation is from a maximum to one half of maximum velocity, the major portion of the poor work extraction velocity range is eliminated. To obtain the maximum work extraction for a given range of velocity fluctuation, the turbine should be designed such that the average value of the minimum and maximum velocity ratio is equal to the velocity ratio for maximum work extraction.

The velocity fluctuation of the gases discharging from the intermittent firing pulse tubes is reduced to less than one half before entering the turbine system by arranging to have two pulse tubes discharge gases in alternating sequence into one common passage leading to the turbine nozzle. The pulse tubes discharging into the same passage are phased such that the velocity crest of the gas stream from one pulse tube coincides with the velocity trough of the gas stream from the other pulse tube. This arrangement is accomplished in the present invention by arranging the pulse tubes to discharge their gases into an annular collector duct having guide vanes as described above, disposed within it to form a number of passages, each pulse tube being disposed to discharge its gases into two adjacent passages and two adjacent pulse tubes each discharging part of its gases into a common passage, all the pulse tubes being synchronized such that if the pulse tubes are numbered consecutively, all the odd numbered pulse tubes fire simultaneously in alternation with the simultaneous firing of all the even numbered pulse tubes.

At high mass flow rates, further reduction of velocity fluctuation is effected in the following manner. The turbine nozzle is designed as a converging nozzle and its minimum cross sectional area is such as to pass the design mass flow of the engine when the steady flow velocity is approximately the local sonic velocity. Thus if the gas flow velocity is fluctuating when passing the design mass flow, the average of the velocity fluctuations must be approximately sonic velocity and therefore the velocity peaks must exceed the velocity of sound. However since sonic velocity cannot be exceeded in a converging nozzle there will be intermittent choking of the turbine nozzle at a frequency equal to twice the operating frequency of the pulse tubes. This limitation of the maximum flow velocity to the local speed of sound cuts off the velocity peaks as the design mass flow is approached and aids in reducing the velocity fluctuation of the gases entering the turbine system. The pressure fluctuations in the passages resulting from the intermittent choking is damped out by tapping Helmholtz-type resonators to the passages.

With the objects of the invention attained as described in the foregoing, the normal operation of the engine is as follows. With reference to Figures 1, 2 and 3, starting is initiated by applying electrical energy to the ignition circuit i.e. distributor and spark plugs or glow plugs 20. The synchronous motor 15 is then energized into operation to turn the flow check valves 13 at the proper rate and sequence and at the same time drive the fuel injection pump 19 to inject fuel at the proper instant into the opening valve pulse tubes. The fuel-air mixture in the pulse tubes in which fuel was injected spreads through the combustion chamber and comes into contact with the ignition plugs 20. By this time the check valves 13 are approximately closed and the fuel-air mixture is exploded on contacting ignition plugs 20. The combustion gases generated by the explosive combustion expand out the tail pipe of the pulse tubes driving out the plugs of momentum air ahead of them. The inertia of the gases discharging out the tail pipe causes the gases in the pulse tubes to expand below the pressure of the surrounding air in the chamber 11 and a fresh charge of air is drawn into the pulse tubes through their tail pipe orifices and through the check valves 13 which have been synchronized to open at the proper time. Fuel again is injected into the air entering through the check valves 13 and the cycle of operation proceeds to repeat itself continuously. This process takes place simultaneously in all the odd numbered pulse tubes and is repeated approximately half cycle out of phase simultaneously in all the even numbered pulse tubes.

When all the pulse tubes 10 are firing, the electrical energy to the ignition plugs 20 may be turned off and ignition is effected by the residual hot gases from the previous explosions.

The alternating discharge of gases from the odd and even numbered set of pulse tubes are directed into the passages of the annular collector duct 22 and distributed evenly to the turbine nozzle annulus 23 which directs the gases in the required direction into the first row of turbine rotor blades by means of the nozzle guide vanes 25.

The turbine system extracts work from the gas stream by one or more turbine stages to drive the compressor system 12 through the shaft 16. The compressor system in turn compresses air into the chamber 11 in which the pulse tubes 10 are enclosed. Since the pulse tubes 10 are capable of generating a high velocity gas stream without precompression of the air in the chamber 11, little or no prerotation of the compressor is necessary to start the engine and thus no high powered starting device is required.

As the design mass flow of the engine is approached in operation, there will be intermittent choked flow at the turbine nozzle giving rise to pressure fluctuations in the collector-nozzle passages. These pressure fluctuations and thus the intensity of the choking is reduced by the Helmholtz-type resonators 27 tapped to the passages as described previously.

To improve the efficiency of the gas flow through the collector duct 22 and turbine nozzle 23, conditions are designed so that there is a small pressure drop from the chamber 11 to the turbine nozzle exit.

After work has been extracted to drive the compressor system, the gases may be ejected out of the nozzle 31 to obtain jet propulsive reaction or the gases may be expanded through additional turbine stages to derive mechanical power. A gas turbine engine according to this invention may therefore be used in a great variety of practical applications.

Although the compressor system illustrated is of the mixed flow type, any suitable type compressor is applicable, the choice depending on the use to which the engine is employed.

While a preferred example of the invention has been shown and described here for purposes of illustration, it is to be clearly understood that various changes in shape, size, arrangement of parts and details of construction may be made without departing from the spirit of the invention or the scope of the subjoined claims.

What I claim is:

1. In a gas turbine engine having a turbine nozzle, means intermittently producing a rise in gas pressure at at least one location, means intermittently producing a rise in gas pressure at at least another location out of phase with said first means, means translating said rises in pressure into kinetic energy to thereby produce at least two intermittent gas jets out of phase, and means disposed in the path of said jets guiding two of said jets which are out of phase into a common segment of the turbine nozzle without substantially changing the kinetic energy of said gas jets, whereby said guiding means discharge gas into said segments at substantially twice the frequency of each translating means.

2. In a gas turbine engine having a turbine nozzle, first means intermittently producing a simultaneous rise in gas pressure at a plurality of locations, other means intermittently producing a simultaneous rise in gas pressure at a plurality of other locations, out of phase with said first means, means translating said rises in pressure into kinetic energy to thereby produce a plurality of simultaneous intermittent gas jets out of phase with another plurality of simultaneous intermittent gas jets, and means disposed in the path of said jets, guiding at least a part of each of two of said gas jets which are out of phase into a common segment of the turbine nozzle without substantially changing the kinetic energy of said gas jets, whereby said guiding means discharge gas into said segment at substantially twice the frequency of each translating means.

3. In a gas turbine engine having a turbine nozzle, first means intermittently producing a simultaneous rise in gas pressure at a plurality of first spaced locations, other means intermittently producing a simultaneous rise in gas pressure at a plurality of locations alternately interposed between said first locations, out of phase with said first means, means translating said rises in pressure into kinetic energy to thereby produce a first plurality of simultaneous intermittent gas jets, alternately located with another plurality of simultaneous intermittent gas jets out of phase with said first plurality of gas jets, and means disposed in the path of said jets, guiding at least a part of each of two adjacent gas jets which are out of phase into a common segment of the turbine nozzle without substantially changing the kinetic energy of said gas jets, whereby said guiding means discharge gas into said segment at substantially twice the frequency of each translating means.

4. In a gas turbine engine having a turbine nozzle, first means intermittently producing a simultaneous rise in gas pressure at a plurality of first spaced locations, other means intermittently producing a simultaneous rise in gas pressure at a plurality of locations alternately interposed between said first locations, out of phase with said first means, means translating said rises in pressure into kinetic energy to thereby produce a first plurality of simultaneous intermittent gas jets, alternately located with another plurality of simultaneous intermittent gas jets out of phase with said first plurality of gas jets, and means disposed in the path of said jets, guiding generally one half of each of two adjacent gas jets which are out of phase into a common segment of the turbine nozzle without substantially changing the kinetic energy of said gas jets, whereby said guiding means discharge gas into said segment at substantially twice the frequency of each translating means.

5. In a gas turbine engine having a gas turbine nozzle, a plurality of intermittent firing combustion gas generators of the resonant pulse-jet type, means synchronizing a plurality of said generators to fire simultaneously, out of phase with the rest of said generators, and a plurality of passages disposed in the path of the jets discharged by said generators, each passage leading, to a segment of the turbine nozzle, at least part of the gas jets discharged from two of said generators firing out of phase one with the other, without substantially changing the kinetic energy of said gas jets.

6. A gas turbine engine as claimed in claim 5, wherein said gas generators all fire at the same frequency.

7. In a gas turbine engine having a gas turbine nozzle, a plurality of intermittent firing combustion gas generators of the resonant pulse-jet type, each comprising a combustion chamber, fuel injecting means, ignition means, an air inlet means upstream of said combustion chamber, a combustion gas discharge means downstream of said combustion chamber producing a gas jet, means intermittently operating said air inlet means of a plurality of said gas generators simultaneously, out of phase with said air inlet means of the rest of said gas generators, and a plurality of passages disposed in the path of said jets, each passage leading, to a segment of the turbine nozzle, at least a part of the gas jets discharged from two of said generators firing out of phase one with the other, without substantially changing the kinetic energy of said gas jets.

8. In a gas turbine engine having a turbine nozzle, a plurality of intermittent firing combustion gas generators of the resonant pulse-jet type, each comprising a combustion chamber, fuel injecting means, ignition means, an air inlet valve upstream of said combustion chamber, a combustion gas discharge tail pipe downstream of said combustion chamber producing a gas jet, mechanical means intermittently operating said valves of a plurality of said gas generators simultaneously, out of phase with said valves of the rest of said generators, and a plurality of passages disposed in the path of said jets, each passage leading, to a segment of the turbine nozzle, at least part of the gas jets discharged from two of said generators firing out of phase one with the other, without substantially changing the kinetic energy of said gas jets.

9. In a gas turbine engine having a turbine nozzle, a plurality of intermittent firing combustion gas generators of the resonant pulse-jet type, each comprising a combustion chamber, fuel injecting means, ignition means, an acoustical check valve upstream of said combustion chamber, a combustion gas discharge tail pipe downstream of said combustion chamber, producing a gas jet, a plurality of acoustically synchronized open ended pipes providing communication from said valves of a first plurality of said gas generators to said valves of the rest of said gas generators, means initially firing simultaneously said first plurality of gas generators, whereafter said first plurality of gas generators fires simultaneously, out of phase with the rest of said gas generators, and a plurality of passages disposed in the path of said jets, each passage leading, to a segment of the turbine nozzle, at least a part of the gas jets discharged from two of said generators firing out of phase one with the other, without substantially changing the kinetic energy of said gas jets.

10. In a gas turbine engine having a turbine nozzle, a plurality of intermittent firing combustion gas generators of the resonant pulse-jet type, each comprising a combustion chamber, fuel injecting means, ignition means, an air inlet means upstream of said combustion chamber, a combustion gas discharge tail pipe downstream of said combustion chamber producing a gas jet, means intermittently operating said fuel injecting and ignition means of a plurality of said gas generators simultaneously, out of phase with said fuel injecting and ignition means of the rest of said gas generators, and a plurality of passages disposed in the path of said jets, each passage leading, to a segment of the turbine nozzle, at least a part of the gas jets discharged from two of said generators firing out of phase one with the other, without substantially changing the kinetic energy of said gas jets.

11. A gas turbine engine as claimed in claim 7, said gas generators being enclosed in an enclosure, a compressor system pressurizing said enclosure, said enclosure being in communication with said combustion gas discharge means downstream of said gas generators, and with said passages.

12. A gas turbine engine as claimed in claim 8, said gas generators being enclosed in an enclosure, a compressor system pressurizing said enclosure, means dependent on the pressure and temperature in said enclosure governing the speed of said mechanical means.

13. In a gas turbine engine having a turbine nozzle, an even plurality of intermittent firing combustion gas generators of the resonant pulse-jet type, adjacently disposed in a common continuous surface, means synchronizing alternate gas generators to fire simultaneously, out of phase with the rest of also alternate gas generators, whereby adjacent generators fire out of phase, an annular duct enclosing the path of the jets discharged by said generators and communicating with the turbine nozzle, a plurality of guide vanes transversely disposed in said duct, dividing said duct into passages, the downstream edges of said guide vanes being adjacent said turbine nozzle, whereby each passage communicates with only one particular segment of the turbine nozzle, said guide vanes being equal in number to said generators and the leading edge of each guide vane being located generally in the center of the path of the gas jet being discharged from each of said generators, whereby each gas jet is discharged into two adjacent passages without substantially changing the kinetic energy of each said gas jet, and whereby each passage leads to a segment of the turbine nozzle approximately half of each gas jet discharged from two adjacent generators firing out of phase.

14. In a gas turbine having a turbine nozzle, a plurality of intermittent firing combustion gas generators adjacently disposed in a common closed surface, each generator comprising a combustion chamber and a tail pipe, means synchronizing alternate gas generators to fire simultaneously, out of phase with the rest of also alternate generators, whereby adjacent generators fire out of phase, an annular duct enclosing the path of jets discharged by said generators and communicating with the turbine nozzle, a plurality of guide vanes transversely disposed in said duct, dividing said duct into passages, the downstream edge of said guide vanes being adjacent said turbine nozzle, whereby each passage communicates with only one particular segment of the turbine nozzle, said guide vanes being equal in number to said generators, and the leading edge of each said guide vane being located generally on the centre line of the tail pipe of each of said generators, and consequently in the center of the path of the gas jet discharged from each generator, whereby each gas jet is discharged into two adjacent passages without substantially changing the kinetc energy of each said gas jet, and whereby each passage leads to a segment of the turbine nozzle approximately half of each gas jet discharged from two, adjacent generators firing out of phase.

15. A gas turbine engine as claimed in claim 5, having Helmholtz-type resonators tapped to said passages to damp out pressure fluctuations caused in said passages by pulsating gas flows from said intermittent combustion gas generators.

16. A gas turbine engine as set forth in claim 5 further defined in that to each passage is tapped at least one Helmholtz-type resonator having a natural frequency approximately twice the frequency of operation of each generator, namely equal to the frequency of the flow pulsations caused in the said passages by the intermittent gas discharges from the intermittent firing combustion gas generators.

17. A gas turbine engine as claimed in claim 5, having Helmholtz-type resonators tapped to said passages to damp out pressure fluctuations, each of said Helmholtz-type resonators having an adjustment screw plug that varies the volume of the resonator cavity to adjust the natural frequency of the resonators.

18. A gas turbine engine as set forth in claim 5 further defined in that to each passage is tapped at least one Helmholtz-type resonator the natural frequency of which is adjustable individually by adjustment screw plugs varying the volume of the resonator cavity, and collectively by adjustment of a common adjustment link coupling on to all the individual said screw plug adjustments, and further, having governing means of collectively adjusting the natural frequency of all the said resonators to approximately twice the frequency of operation of each generator, namely equal to the frequency of the pulsating flow passing through the passages in said annular collector duct, the governing being determined by the operating frequency of the intermittent firing gas generators causing the pulsating gas flow.

References Cited in the file of this patent

UNITED STATES PATENTS

| | | |
|---|---|---|
| 1,860,569 | Bourne | May 31, 1932 |
| 2,225,398 | Hamblin | Dec. 17, 1940 |
| 2,344,835 | Stalker | Mar. 21, 1944 |
| 2,474,553 | Stephens | June 28, 1949 |
| 2,508,396 | Jordan | May 23, 1950 |
| 2,543,758 | Bodine | Mar. 6, 1951 |
| 2,567,079 | Owner et al. | Sept. 4, 1951 |
| 2,593,523 | Bauger | Apr. 22, 1952 |
| 2,627,163 | Anderson et al. | Feb. 3, 1953 |
| 2,629,225 | Ammann | Feb. 24, 1953 |
| 2,650,752 | Hoadley | Sept. 1, 1953 |

FOREIGN PATENTS

| | | |
|---|---|---|
| 565,381 | Germany | Nov. 29, 1932 |
| 445,550 | Great Britain | Apr. 9, 1936 |
| 619,232 | Great Britain | Mar. 7, 1949 |
| 261,468 | Switzerland | Aug. 16, 1949 |